__United States Patent__ [19]

Damiano

[11] 3,920,464

[45] Nov. 18, 1975

[54] REFRACTORY BONDING SYSTEM

[75] Inventor: John Damiano, Linden, N.J.

[73] Assignee: Quigley Co., Inc., New York, N.Y.

[22] Filed: Oct. 21, 1974

[21] Appl. No.: 516,276

[52] U.S. Cl. .................... 106/58; 106/59; 106/63; 106/64
[51] Int. Cl.² .................. C04B 35/04; C04B 35/06
[58] Field of Search ........... 106/58, 59, 63, 64, 106

[56] References Cited
UNITED STATES PATENTS

| | | | |
|---|---|---|---|
| 3,357,842 | 12/1967 | Bowman | 106/58 |
| 3,392,037 | 7/1968 | Neely et al. | 106/58 |
| 3,473,939 | 10/1969 | Mayberry et al. | 106/58 |
| 3,479,194 | 11/1969 | Davies et al. | 106/58 |
| 3,615,777 | 10/1971 | Davies et al. | 106/59 |
| 3,839,057 | 10/1974 | Treffner et al. | 106/58 |

FOREIGN PATENTS OR APPLICATIONS

| | | | |
|---|---|---|---|
| 338,503 | 6/1972 | U.S.S.R. | 106/106 |

OTHER PUBLICATIONS

Foessel et al. "Improved Phosphate–Bonded Basic Refractores" Ceramic Bulletin 49 (7) pp. 652–657.

*Primary Examiner*—Helen M. McCarthy
*Attorney, Agent, or Firm*—Connolly and Hutz

[57] ABSTRACT

A quick-setting refractory composition comprising basic refractory, from about 0.5 to 3 weight percent active calcium oxide, from about 2.5 to 5 weight percent glassy polyphosphate and from about 1.5 to 4 weight percent dibasic calcium phosphate or tricalcium phosphate.

8 Claims, No Drawings

3,920,464

REFRACTORY BONDING SYSTEM

BACKGROUND OF THE INVENTION

This invention relates to refractory compositions. More specifically, it relates to an improved phosphate bond system for quick-setting basic refractory compositions.

Basic refractory compositions useful for casting and gunning in, for example, steel-making furnaces should possess certain properties. These properties include the ability to develop initial set, i.e., to harden rather rapidly to a self-sustaining condition, excellent hot strength and superior resistance to erosion and slag attack.

The use of phosphates for improving the hot strength of basic refractories has received considerable attention. U.S. Pat. No. 3,390,002 discloses burned magnesite shapes having excellent tensile strength at temperatures as high as 2900°F (1600°C) formed by combining dead-burned magnesite finely divided silica, lime-yielding materials and calcium phosphate-yielding materials in such ratio as to give phosphates which are substantially all calcium silicophosphates. The use of polyphosphates to develop hot strength in basic refractories is taught in U.S. Pat. No. 3,304,187 where magnesia in the aggregate is reacted with sodium polyphosphate to produce the bonding; other components such as lime can be present in the aggregate to promote mineralization of the magnesia and enhance the bonding effect of the polyphosphate. U.S. Pat. No. 3,285,758 discloses the addition of a solution of ammonium phosphates containing specified proportions of ortho, pyro and polyphosphates to promote initial set in basic refractory intended for gunning operations. U.S. Pat. No. 3,357,843 teaches the addition of polyphosphates for inhibiting the popping tendency during heating of refractory compositions in which monosodium phosphate and finely divided reactive alkaline earth metal oxide such as lime are added to provide initial set; the setting reaction presumably involves the in situ formation of hydrated alkaline earth metal acid phosphate, as explained in U.S. Pat. No. 3,357,842.

SUMMARY OF THE INVENTION

It has now been discovered that the introduction of preformed dicalcium phosphate or tricalcium phosphate into quick-setting refractory compositions affords unexpected advantages over the results obtained with in situ formation of dicalcium phosphate from monosodium phosphate and lime. Accordingly, the present invention entails a quick-setting refractory composition comprising at least about 85 weight percent particulate basic refractory, from about 0.5 to 3 weight percent finely divided active calcium oxide, from about 2.5 to 5 weight percent glassy polyphosphate and from about 1.5 to 4 weight percent finely divided dibasic calcium phosphate or tricalcium phosphate.

DETAILED DESCRIPTION OF THE INVENTION

The refractory compositions of this invention, since they possess initial set, excellent hot strength and good resistance to erosion and slag attack, are of particular value in casting and gunning operations associated with basic steel-making furnaces.

The particulate refractory aggregate which comprises about 85 percent or more of the refractory composition can be any basic refractory grain. This includes, but is not limited to, magnesia alone or in combination with dead-burned dolomite. The aggregate particles include various combinations of fine and coarse fractions which are well established in the art for casting and gunning refractory compositions, typical particle size distributions being illustrated in the examples which follow.

The finely divided active calcium oxide, or lime, content of the refractory composition can vary from about 0.5 to about 3 weight percent. Refractories containing active lime levels below about 0.5 percent do not develop suitable initial set, while those with active lime contents above about 3 percent set too rapidly for practical use in casting and gunning. Preferred active lime level is about 1.0 weight percent. By "finely divided active lime" is meant calcium oxide substantially all passing a 16-mesh (U.S.) screen and capable of readily reacting at room temperature with alkali metal phosphate in the presence of water to form hydrated dibasic calcium phosphate. The active lime source can be lime alone or lime combined with other alkaline earth oxides. A convenient, and preferred, source of the active lime is known as −16 mesh pebble lime, a lightly burned dolomite which substantially all passes a 16-mesh (U.S.) screen. A typical −16 mesh pebble lime has the following chemical analysis:

|  | wgt % |
| --- | --- |
| CaO | 58.2 |
| MgO | 40.2 |
| $SiO_2$ | 0.80 |
| $Al_2O_3$ | 0.25 |
| $Fe_2O_3$ | 0.08 |
| S | 0.03 |
| Loss on ignition | 0.4 |

The glassy polyphosphate of the refractory composition has the general formula $M_{n+2}P_nO_{3n+1}$, where $M$ represents an alkali metal or ammonium ion and n is an integer equal to or greater than 3. By "glassy" is meant amorphous or non-crystalline. The glassy polyphosphates commercially available are generally mixtures of the polyphosphate having different values of $n$ in the type formula and are usually characterized by an average value of $n$, often referred to as the chain length of the polyphosphate. While the average chain length of the glassy polyphosphate used in the practice of this invention can vary over a wide range, the preferred range is between about 10 and 30. Sodium polyphosphates are most commonly used. Examples of glassy polyphosphates of particular value are Glass H and especially Hexaphos, trade names for water-soluble sodium polyphosphates with average chain lengths of about 21 and 13, respectively, offered by FMC Corporation, Industrial Chemicals Division, of New York, New York. The effective range for the polyphosphate is between about 2.5 and 5 weight percent of the refractory composition. Polyphosphate levels below about 2.5 percent provide poor initial set and hot strength, while levels above about 5 percent generally result in rapidly diminishing hot strength. The preferred polyphosphate level is about 3.5 weight percent.

The superior hot strengths of the refractory composition are obtained by the addition of finely divided dibasic calcium phosphate or tricalcium phosphate in amounts between about 1.5 and 4 weight percent. By "finely divided" phosphate is meant phosphate substantially all passing a 100-mesh (U.S.) screen. Phosphate levels outside this weight range, while offering hot strength to basic refractories, do not produce the superior bond strengths contemplated. The preferred addition is about 2.5 weight percent dibasic calcium phosphate dihydrate.

The following examples are merely illustrative and are not to be construed as limiting the invention, the scope of which is defined by the appended claims. In these examples, unless otherwise indicated, temperatures are expressed in °F, compositions are in weight percent and modulus of rupture (M/R) values are in psi (kg/cm$^2$). All references to mesh size in the disclosure and examples are based on the U.S. Sieve Series (ASTM E-11-61); see Lange's Handbook of Chemistry, 11th Edition, Section 11, page 2 (1973).

EXAMPLES 1-9

Quick-setting refractories of the compositions indicated in Runs 1 through 9 of Table I were prepared as follows: The listed ingredients for each run, equivalent to 5 kg of refractory composition, were hand blended by mixing with a trowel for about one minute. Water equivalent to 11 weight percent of the dry blend was then added and the mixing was continued for an additional minute to give a mixture of good casting consistency. The wet blend was cast into bars using 2 × 2 × 9 inches (5.1 cm × 5.1 cm × 22.9 cm) molds. The bars were allowed to set for about 5 hours and were then removed from the molds and air dried at about 220°F (105°C) overnight.

The refractory compositions were tested for hot modulus of rupture (M/R) by the following technique: Three dried test bars each for paired runs (Runs 1A and 1B, Runs 2A and 2B, etc; a total of 6 bars) were placed into a M/R test furnace of inside space about 3 × 2 × 2.5 feet (90 cm × 60 cm × 75 cm) containing two parallel 1.5 inches (3.8 cm) diameter aluminum rods with their axes 5.25 inches (13.3 cm) apart, the bars being centrally located perpendicularly across the rods. The furnace was heated to 2300 ± 10°F (1260 ± 6°C) over a period of about 2 hours and held at that temperature for 5 hours. The bars were then broken individually at 2300°F (1260°C) at 10-minute intervals using an aluminum breaker bar that applied central point loading uniformly across the width of the test bar. Loading was applied through a system which increased the load from zero to the breaking value at the rate of about 300 lb/in$^2$ min (0.35 kg/cm$^2$ sec). Average M/R values for each of the refractory compositions are listed in Table I.

Inspection of the tabulated results demonstrates the advantage realized by substitution of preformed dibasic calcium phosphate for its stoichiometric equivalent in the form of lime and monosodium phosphate. The introduction of preformed dibasic calcium phosphate is exemplified by the "A" runs, with the respective stoichiometric counterparts represented by each corresponding "B" run. Aside from the case of Runs 1A and 1B, which fall below the calcium phosphate levels of the present invention, each comparison demonstrates the clear superiority resulting from the use of preformed calcium phosphate in accordance with the present invention.

Comparable advantages are obtained if dead-burned dolomite is substituted for the 5-7 mesh, 7-16 mesh and −16 mesh portions of the magnesia or Glass H (avg. $n = 21$) is substituted for Hexaphos in the refractory composition.

Table I

| Run | 1A | 1B | 2A | 2B | 3A | 3B | 4A | 4B | 5A | 5B | 6A | 6B | 7A | 7B | 8A | 8B | 9A | 9B |
|---|---|---|---|---|---|---|---|---|---|---|---|---|---|---|---|---|---|---|
| Composition wgt % Refractory — Magnesia[1] | | | | | | | | | | | | | | | | | | |
| 5-7 mesh | 15.0 →  | | | | | | | | | | | | | | | | | |
| 7-16 mesh | 48.0 → | | | | | | | | | | | | | | | | | |
| −16 mesh | 4.0 → | | | | | | | | | | | | | | | | | |
| pulverized | 28.6 | 27.9 | 27.1 | 25.3 | 25.6 | 22.6 | 27.6 | 26.9 | 26.1 | 24.3 | 24.6 | 21.6 | 26.1 | 25.4 | 24.6 | 22.8 | 23.1 | 20.1 |
| Hexaphos[2] | 2.5 | 2.5 | 2.5 | 2.5 | 2.5 | 2.5 | 3.5 | 3.5 | 3.5 | 3.5 | 3.5 | 3.5 | 5.0 | 5.0 | 5.0 | 5.0 | 5.0 | 5.0 |
| CaO[3] | 0.9 | 1.2 | 0.9 | 1.7 | 0.9 | 2.2 | 0.9 | 1.2 | 0.9 | 1.7 | 0.9 | 2.2 | 0.9 | 1.2 | 0.9 | 1.7 | 0.9 | 2.2 |
| CaHPO$_4$.2H$_2$O[4] | 1.0 | 0 | 2.5 | 0 | 4.0 | 0 | 1.0 | 0 | 2.5 | 0 | 4.0 | 0 | 1.0 | 0 | 2.5 | 0 | 4.0 | 0 |
| NaH$_2$PO$_4$[5] | 0 | 1.4 | 0 | 3.5 | 0 | 5.7 | 0 | 1.4 | 0 | 3.5 | 0 | 5.7 | 0 | 1.4 | 0 | 3.5 | 0 | 5.7 |
| Avg. M/R, psi at 2,300°F | 69 | 135 | 171 | 101 | 165 | 56 | 104 | 77 | 183 | 123 | 179 | 104 | 131 | 87 | 163 | 53 | 130 | 45 |
| (kg/cm$^2$ at 1260°C) | 4.9 | 9.5 | 12.0 | 7.1 | 11.6 | 3.9 | 7.3 | 5.4 | 12.9 | 8.6 | 12.6 | 7.3 | 9.2 | 6.1 | 11.5 | 3.7 | 9.1 | 3.2 |

(1) Magnesia particle size distribution (U.S. screens):
    5-7 mesh = through 5 mesh, retained on 7 mesh
    7-16 mesh = through 7 mesh, retained on 16 mesh
    −16 mesh = all through 16 mesh, 60-80 weight percent through 325 mesh
(2) Hexaphos — FMC Corp.; glassy sodium polyphosphate, avg. n = 13
(3) CaO — Mallinckrodt Chem. Works; purified powder (−16 mesh)
(4) CaHPO$_4$ · 2H$_2$O — Stauffer Chem. Co.; powder, NF grade (−100 mesh)
(5) NaH$_2$PO$_4$ — Fisher Scientific Co.; powder, tech grade

EXAMPLES 10-12

Quick-setting refractory compositions were prepared and tested as Runs 10 through 12 following the procedures of Examples 1-9. The compositions tested and the test results are shown below. Casting compositions containing greater than 3 percent CaO set too quickly to allow proper casting while those containing much less than 0.5 percent CaO did not set.

| Run | 10 | 11 | 12 |
|---|---|---|---|
| Composition, wgt % [1] | | | |
| Refractory - Magnesia | | | |
| 5-7 mesh | 15.0 | 15.0 | 15.0 |
| 7-16 mesh | 48.0 | 48.0 | 48.0 |
| −16 mesh | 4.0 | 4.0 | 4.0 |
| pulverized | 26.5 | 25.0 | 24.0 |
| Hexaphos | 3.5 | 3.5 | 3.5 |
| CaHPO$_4$.2H$_2$O | 2.5 | 2.5 | 2.5 |
| CaO | 0.5 | 2.0 | 3.0 |
| Avg. M/R, psi at 2300°F | 204 | 112 | 136 |
| (kg/cm$^2$ at 1260°C) | 14.3 | 7.9 | 9.6 |

(1) Component sources same as in Table I

EXAMPLE 13

The procedures for the preparation and testing of Run 5A were followed with the following quick-setting composition:

| Component | | Wgt % |
|---|---|---|
| Refractory - Magnesia | | 92.6 |
| 5–7 mesh | 15.0 | |
| 7–16 mesh | 48.0 | |
| –16 mesh | 14.0 | |
| pulverized | 15.6 | |
| Hexaphos | | 3.5 |
| $CaHPO_4 \cdot 2H_2O$ | | 2.4 |
| –16 mesh pebble lime[1] | | 1.5 |

[1] Pfizer E-Z Flo Quicklime (partially burned dolomite containing about 60 weight percent active CaO). Other components source same as Run 5A.
The average hot M/R was 175 psi (12.3 kg/cm²).

EXAMPLE 14

Substitution of -100 mesh tricalcium phosphate ($3Ca_3(PO_4)_2 \cdot Ca(OH)_2$) for the $CaHPO_4 \cdot 2H_2O$ in the composition of Example 13 resulted in a hot M/R of 263 psi (18.5 kg/cm²) when the composition was prepared and tested following the procedures of Run 5A.

What is claimed is:

1. A quick-setting refractory composition consisting essentially of at least about 85 weight percent particulate basic refractory, from about 0.5 to 3 weight percent finely divided active calcium oxide, from about 2.5 to 5 weight percent glassy alkali metal or ammonium polyphosphate and from about 1.5 to 4 weight percent preformed finely divided dibasic calcium phosphate.

2. The composition of claim 1 wherein said particulate refractory comprises magnesia.

3. The composition of claim 1 wherein said particulate refractory comprises dead-burned dolomite.

4. The composition of claim 1 wherein said glassy polyphosphate has an average chain length of from about 10 to 30.

5. The composition of claim 1 wherein said calcium oxide is in the form of −16 mesh pebble lime.

6. A refractory composition comprising about 1.0 weight percent active calcium oxide substantially all passing a 16-mesh screen, about 3.5 weight percent glassy sodium polyphosphate of average chain length of about 13 and about 2.5 weight percent dibasic calcium phosphate dihydrate substantially all passing a 100-mesh screen, the remainder of the composition being particulate basic refractory.

7. The composition of claim 6 wherein said calcium oxide is in the form of pebble lime.

8. The composition of claim 6 wherein said particulate refractory comprises magnesia.

* * * * *

PC(Qu) 5619

UNITED STATES PATENT AND TRADEMARK OFFICE
CERTIFICATE OF CORRECTION

PATENT NO. : 3,920,464
DATED : NOVEMBER 18, 1975
INVENTOR(S) : JOHN DAMIANO

It is certified that error appears in the above-identified patent and that said Letters Patent are hereby corrected as shown below:

Column 3, Table I, line 4 of footnote n (1) should read
-- -16 mesh = all through 16 mesh, 0-20 weight percent through 325 mesh --.

Column 3, Table I, line 5 of footnote n (1) (which line was omitted from the patent) should read --pulverized = all through 16 mesh, 60-80 weight percent through 325 mesh--.

Column 3, Table I, footnote n (3) should read
-- CaO - Mallinckrodt Chem. Works; purified powder (-16 mesh) --.

Signed and Sealed this

Twenty-seventh Day of July 1976

[SEAL]

Attest:

RUTH C. MASON
Attesting Officer

C. MARSHALL DANN
Commissioner of Patents and Trademarks